(12) United States Patent
Ghosh

(10) Patent No.: US 8,645,841 B2
(45) Date of Patent: Feb. 4, 2014

(54) UNIFIED GREETINGS FOR SOCIAL MEDIA

(75) Inventor: Arpan Ghosh, Parsippany, NJ (US)

(73) Assignee: Avaya Inc., Basking Ridge, NJ (US)

( * ) Notice: Subject to any disclaimer, the term of this patent is extended or adjusted under 35 U.S.C. 154(b) by 129 days.

(21) Appl. No.: 12/844,564

(22) Filed: Jul. 27, 2010

(65) Prior Publication Data

US 2011/0047479 A1 Feb. 24, 2011

Related U.S. Application Data

(60) Provisional application No. 61/235,838, filed on Aug. 21, 2009.

(51) Int. Cl.
*G06F 3/00* (2006.01)
(52) U.S. Cl.
USPC .......................................... 715/747; 709/206
(58) Field of Classification Search
USPC .............. 715/747; 709/206; 379/88.12, 88.23
See application file for complete search history.

(56) References Cited

U.S. PATENT DOCUMENTS

| | | | |
|---|---|---|---|
| 6,640,230 B1 * | 10/2003 | Alexander et al. ..................... | 1/1 |
| 7,673,327 B1 * | 3/2010 | Polis et al. ......................... | 726/5 |
| 7,688,850 B2 | 3/2010 | Fletcher et al. | |
| 7,827,561 B2 | 11/2010 | McKee et al. | |
| 2002/0090069 A1 | 7/2002 | Yaker | |
| 2004/0194116 A1 | 9/2004 | McKee et al. | |
| 2005/0047562 A1 * | 3/2005 | Holz et al. ................. | 379/88.22 |
| 2006/0083358 A1 * | 4/2006 | Fong et al. ................. | 379/88.13 |
| 2007/0011367 A1 * | 1/2007 | Scott et al. ....................... | 710/48 |
| 2007/0260694 A1 * | 11/2007 | Boss et al. ..................... | 709/207 |
| 2008/0059587 A1 * | 3/2008 | Burtner et al. ................ | 709/206 |
| 2008/0112546 A1 | 5/2008 | Fletcher et al. | |
| 2008/0133302 A1 * | 6/2008 | Brauninger et al. .............. | 705/8 |
| 2008/0162510 A1 * | 7/2008 | Baio et al. ..................... | 707/100 |
| 2008/0263158 A1 | 10/2008 | del Cacho et al. | |
| 2009/0009343 A1 | 1/2009 | Boyer et al. | |
| 2010/0023472 A1 * | 1/2010 | Loeb .............................. | 706/47 |
| 2010/0080362 A1 | 4/2010 | Weber et al. | |
| 2011/0004503 A1 * | 1/2011 | Farrell et al. ..................... | 705/9 |

FOREIGN PATENT DOCUMENTS

EP 1924066 5/2008

OTHER PUBLICATIONS

Extended European Search Report for EP Application No. 10172583.6, mailed on Mar. 1, 2012.
Official Action (with English translation) for Korean Patent Application No. 2010-0081655 dated Sep. 11, 2013, 6 pages.

* cited by examiner

*Primary Examiner* — Tuyetlien Tran
*Assistant Examiner* — Patrick Ramsey
(74) *Attorney, Agent, or Firm* — Sheridan Ross P.C.

(57) ABSTRACT

A unified greeting system scans social media for content. The content can be any type of post to a social media site. If content is directed to a user of the unified greeting system and if the user is currently unavailable, the unified greeting system determines if the content requires a reply. If a reply is warranted, the unified greeting system determines the characteristics of the content to determine the type of reply. Then, the unified greeting system provides the reply, which can be an "out-of-office message." The out-of-office message is the posted to the social media site to alert the poster that the person is currently unavailable.

18 Claims, 9 Drawing Sheets

Fig. 5

UNIFIED GREETINGS FOR SOCIAL MEDIA

CROSS REFERENCE TO RELATED APPLICATIONS

This application claims the benefit of and priority under 35 U.S.C. §119(e) to U.S. Patent Application No. 61/235,838, filed Aug. 21, 2009, entitled "MOJO," which is incorporated herein by reference in its entirety.

BACKGROUND

A well known problem exists with regard to message greetings. One has to individually administer greetings for each message type, e.g., voice recordings for voice greetings and text for email, Instant Messaging, etc. This problem is worsened by the fact that some users change their greeting to customize the greeting for the day and date. Further, messages that show the user as busy or out of the office can further add time to the process. Out-of-Office greetings are also typically customized to include dates of absence, date of return, etc. In addition, there may be company policies to enforce regarding the content for such greetings. Exacerbating these problems is the popularity of participation in blogs, micro-blogs, social networks, and other social media and the inability to extend greetings outside of the current voice and email paradigms.

Specifically, there is no way currently to extend calendar information, greetings, and/or Out-of-Office information to certain types of social networks. Some of these social media are passive, e.g., they require the user to navigate a browser and/or login to a service. Another characteristic of these passive social networks are that a user will not necessarily receive specific communications other than RSS feeds from social networks. Examples of these passive social networks are discussion groups, message boards, online selling venues (e.g., eBay. Craig's List, and the like), etc. This passivity creates a problem of how to respond to a request for participation or discussion when the user is unavailable to navigate to the site, unavailable to read the content or the RSS feed of the content. Another class of social media is active, where information comes in from the sender because the receiver has subscribed to the content. Examples of such active social media are MySpace, LinkedIn, etc.

There is an additional problem of how much information that the user wants to share with the person(s) requesting their communication and in what form to best share the information. The fact that many of these venues are public means that the user has the additional problem of posting for public consumption any replay message. Still another problem is the coordination of responses through an ever increasing number of media and venues. For example, if one responded to an email query with an Out of Office assistant, a social network response to the same person would be redundant and usurp bandwidth from the party receiving redundant Out of Office notices. When a party, in which a person frequently communicates, is out of the office, the multiple out-of-office messages can be distracting and cost a great deal of bandwidth across a large enterprise.

SUMMARY

It is with respect to the above issues and other problems that the embodiments presented herein were contemplated. Embodiments present a system for scanning social media for content. The content can be any type of post to a social media site. If content is directed to a user of the system, the system determines if the content requires a reply. If a reply is warranted, the system determines the characteristics of the content to determine the type of reply. A unified greeting system provides the reply, which can be an out-of-office message. The message is the posted to the social media site to alert the poster that the person is currently unavailable.

The embodiments presented herein extend greetings capabilities and tailor those capabilities to active and passive social media. One improvement is to implement a web robot (referred to as a "bot") or a wizard (e.g., a software application) for passive social media. The bot can periodically browse or navigate to the social networks and/or screen RSS feeds and filter content, based on name and/or keyword searches, for a request for communications. If the bot detects such a request, the bot can determine the venue (e.g., Facebook, LinkedIn, Twitter, EBay, Craig's List, etc.). The bot may also determine the requesting party, the trust basis with the requesting party, the degrees of separation from the requesting party, or other information about the content. Based on rules that the owner of the bot has configured and the other information defined above, a messaging system can respond on the social media or alternatively via a private email, instant message (IM), or through other communication media.

The bot may be located advantageously on the user's device or computer and/or could be running on a server when such user's device or PC is not available. The bot can be programmed and/or may implement forms of machine learning over time based on the behaviors of the user when the user is available to respond personally. The messaging system may pull the basis of a response from a calendar, may pull a pre-configured response set up by the user and/or the system, may pull a response from various greetings or an Out of Office indication, or may pull other information. Further, the messaging system can filter the basis of the response based on various information.

Another improvement extends the information about trusted contacts and un-trusted contacts and resolves communication requests by determining information like degrees of separation for social networks, the topic of a communication, relationship within an organization, or the like. The messaging system can respond by appropriately limiting the scope of the information provided based on these and other factors. Based on the venue, the information requested, and other such factors, the messaging system may add, delete, or change portions of greetings, certain calendar entries, or other information to a level appropriate to those factors.

The embodiments presented herein may also have the ability to escalate automatically the notification to a user to send a notification to a mobility application when certain content, requesting parties, keywords, and/or requests are detected. Thus, the system can escalate responses based on communications requests from social media.

Finally, the system can coordinate responses so that if party A frequently contacts party B and party A has already received notice some number of times that party B is unavailable and cannot respond, the system can suppress at least one response. The coordination of response can include limiting the responses to a specific number of responses sent over a single media and/or to a predetermined number of responses across two or more forms of media. The rules of the coordination can be specified by the user.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "stalking" means the process of determining a person is presently using a social media network and can be contacted on that social media network in real time.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of several examples, it should be appreciated that individual aspects can be separately claimed.

BRIEF DESCRIPTION OF THE DRAWINGS

The present disclosure is described in conjunction with the appended figures:

FIG. 5 is an embodiment of a user interface to create a greeting;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1A:
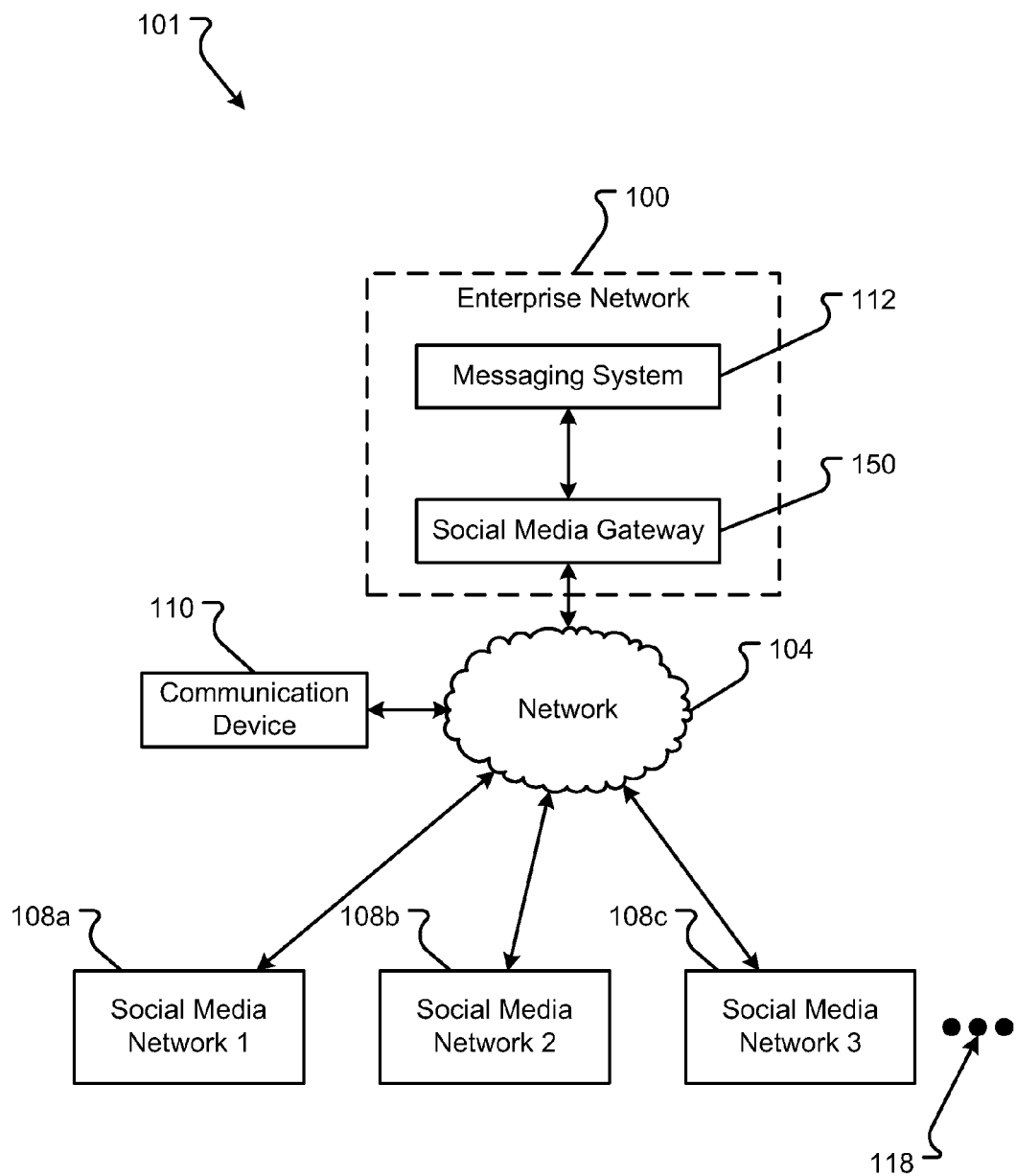
FIG. 1A is a block diagram of an embodiment of a communication system operable to automatically respond to content provided by persons using social media networks.

A communication system 101, for interacting with persons using social media is shown in FIG. 1. The communication system 101 can include a enterprise network 100, a network 104, and one or more types of social media networks or systems, such as social media network 1 108a, social media network 2 108b, and social media network 3 108c. Social media networks 1 108a, 2 108b, and/or 3 108c can be any social media including, but not limited to, networks, websites, blogs, RSS feeds, micro blogs, or computer enabled systems. For example, a social media network may be MySpace, Facebook, Twitter, Linked-In, Spoke, or other similar computer enabled systems or websites. The communication system 101 can communicate with more or fewer social media networks 108a, 108b, and/or 108c than those shown FIG. 1, as represented by ellipses 118.

The network 104 can be any network or system operable to allow communication between the enterprise network 100 and the one or more social media networks 108a, 108b, and/or 108c. The network 104 can represent any communication system, whether wired or wireless, using any protocol and/or format. The network 104 provides communication capability for the enterprise network 100 to communicate with sites corresponding to the one or more social media networks 108a, 108b, and/or 108c. However, the network 104 can represent two or more networks, where each network is a different communication system using different communication protocols and/or formats and/or different hardware and software. For example, network 104 can be a wide area network, local area network, the Internet, a cellular telephone network, or some other type of communication system. The network may be as described in conjunction with FIGS. 7 and 8.

An enterprise network 100 can be a system that can communicate with one or more persons that use social media networking sites. The enterprise network 100 can be hardware, software, or a combination of hardware and software. The enterprise network 100 can be executed by one or more servers or computer systems, as described in conjunction with FIGS. 7 and 8. The enterprise network 100 can include all systems, whether hardware or software, that allow the enterprise network 100 to receive, service, and respond to social media contacts. An embodiment of the enterprise network 100 is described in conjunction with FIG. 1B.

The enterprise network 100 may include a messaging system 112 and a social media gateway 150. While the messaging system 112 and the social media gateway 150 are shown as being a part of the contact system 102, in other embodiments, the messaging system 112 and/or the social media gateway 150 are separate systems or functions executed separately from the enterprise network 100 and/or executed by a third party. The messaging system 112 may process and receive messages. The social media gateway 150 can receive and translate messages from the one or more social media networks 108a, 108b, and/or 108c. An embodiment of the messaging system 112 is described in conjunction with FIG. 1B. An embodiment of the social media gateway 150 is described in conjunction with FIG. 2.

The enterprise network 100 may also communicate with one or more communication devices 110. The communication devices 110 can represent a user's cell phone, email system, personal digital assistant, laptop computer, or other device that allows the enterprise network 100 to interact with the customer. The enterprise network 100 can modify a non-direct contact, from a social media network 108a, 108b, and/or 108c, into a directed contact by sending a response message directly to a customer's communication device 110.

Figure 1B:
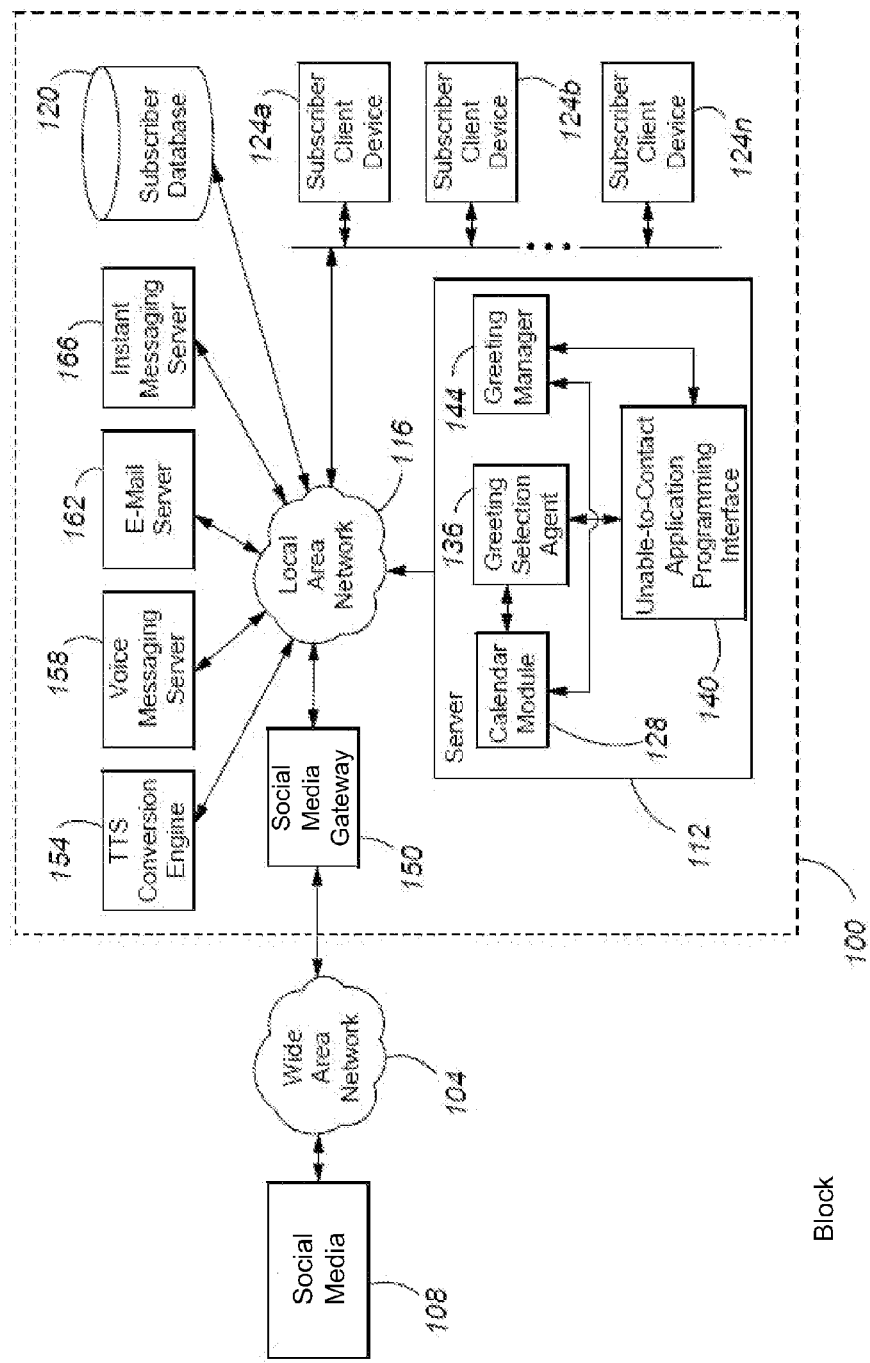
FIG. 1B is a block diagram of an embodiment of a messaging system operable to automatically respond to content provided by persons using social media networks.

FIG. 1B depicts an architecture for an embodiment of an enterprise network 100. The enterprise network 100 is in communication, via a network, e.g., a Wide Area Network or WAN 104, with one or more social media sites 108. The enterprise network 100 includes a messaging system 112 in communication, via Local Area Network 116, with a gateway 150, Text-To-Speech or TTS conversion engine 154, voice messaging server 158, e-mail server 162, instant messaging server 166, user database 120 and a plurality of user client devices 124a-n.

The WAN 104 may be a packet-switched network, such as the Internet, using the TCP/IP suite of protocols or a circuit-switched network, such as the Public Switched Telephone Network or PSTN or a wireless cellular services network, and LAN 116 is commonly a packet-switched network using an Ethernet protocol. As will be appreciated, other protocols may be employed depending on the application.

Figure 2:
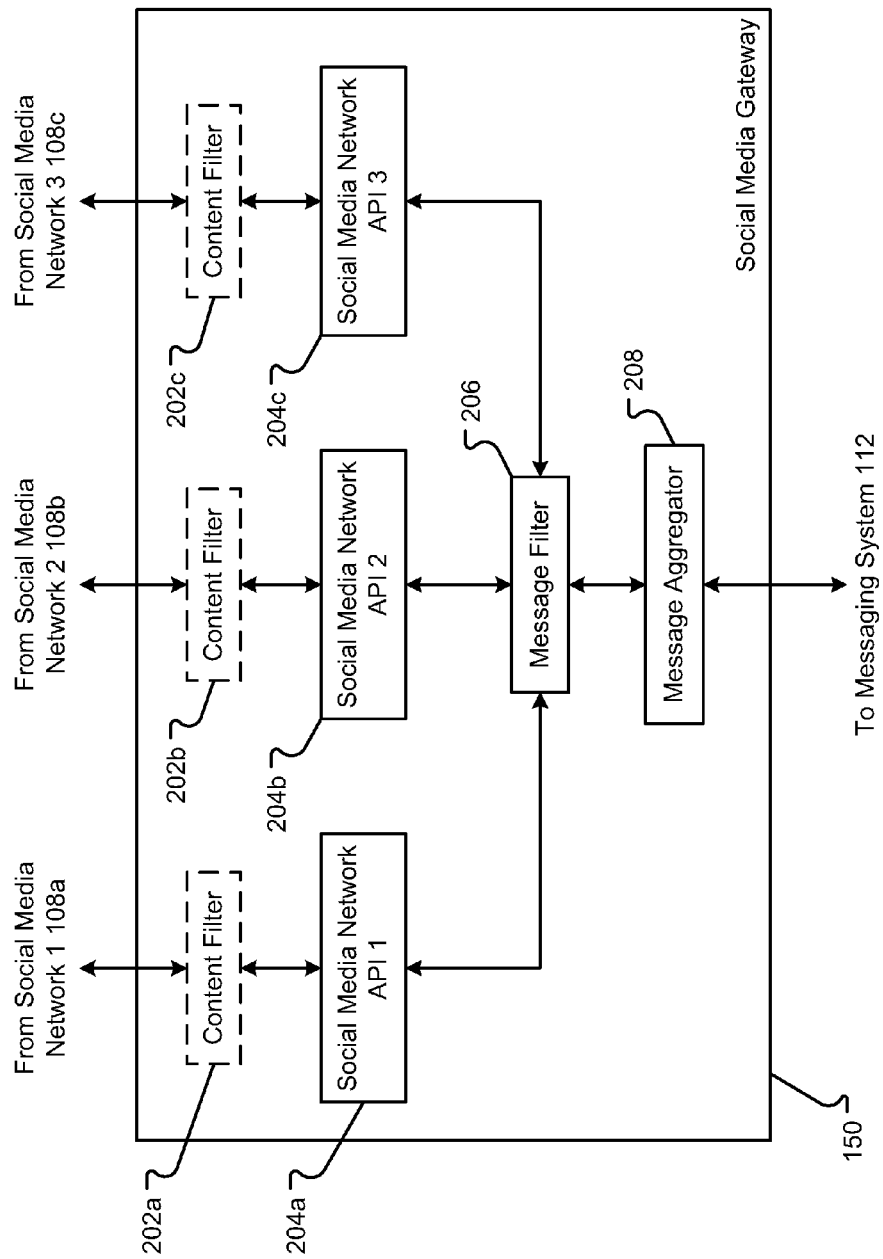
FIG. 2 is a block diagram of an embodiment of a social media gateway.

The social media gateway 150 is described in conjunction with FIG. 2. The TTS conversion engine 154 converts text into corresponding speech and is conventional. The user database 120 includes user information, such as user identities, electronic addresses, scheduling information (e.g., calendars), task lists, contact management information and preferences, public folders, social media aliases, social media logon credentials, lists of subscriptions to active and passive social media, and organization and areas of responsibility.

The enterprise network 100 includes a number of messaging servers. The voice messaging server 158 receives content or other information from callers, stores, manages, and provides information to users' voice messages. The e-mail server 162 receives, stores, administers, and provides e-mail to users. Each user has a message box containing their stored messages. Instant messaging server 166 receives and provides to the user instant messages. In one configuration, two or more of the messaging servers are integrated, as in the case of Modular Messaging™ by Avaya, Inc.

The messaging system 112 includes a number of computational modules, specifically the calendar module 128 which receives and executes scheduling requests and updates and meeting invitations from a user, a greeting manager 144 which interfaces with users to receive and store, as part of one or more calendar entries, customized greetings, greeting selection agent 136 that receives contacts, selects an appropriate default or customized greeting, and provides the selected greeting to the contactor, and unable-to-contact Application Program Interface or API 140 that processes Structured Query Language or SQL database queries received from the foregoing components. In alternative embodiments, the greeting manager 144 may employ a machine learning ability to determine how a user responds to social media content. The machine learning ability may help tailor the greeting managers 144 formation of greetings and management of greetings.

The calendar module 128 is conventional.

The customized greeting, which is stored as part of one or more calendar entries, is commonly played, via TTS conversion engine 154, to callers as a voice equivalent or transmitted to text message senders (which includes all form of text messages including e-mails, instant messages, social media posts, etc.) as a text equivalent to what is stored as the customized greeting. The greeting is provided to contactors, in the form in which it is stored, while the calendar entry is current, or active.

There is no need for the user to enable or disable the greeting. When the calendar entry is current (or is active), the greeting is provided automatically to contactors. When the calendar entry is no longer current (or is inactive), the greeting is no longer provided automatically to contactors.

The greeting, as stored, may be supplemented when provided to a contactor. For example, a default prologue, such as "Hi! This is X", and/or an epilogue, such as "Please leave a message after the beep" or "Thanks you and have a nice day"), that is not part of the customized greeting as stored, may be provided before or after, respectively, the customized greeting.

The greeting manager 144 administers the customized greeting for any entry on the electronic calendar. This would allow the user to customize the greeting, for each calendar entry. It also permits the user to set up the customized greeting at the time that the calendar entry is added or otherwise entered. As noted, the customized greeting can be sent in an email, played as a voice greeting, posted as a reply to social media content or post, or used as an instant messaging response.

An embodiment of the social media gateway 150 is shown in FIG. 2. In embodiments, the social media gateway 150 functions as a bot to find and responds to social media content. The social media gateway 150 can include one or more components which may include hardware, software, or combination of hardware and software. The social media gateway 150 can be executed by a computer system such as those described in conjunction with FIGS. 7 and 8. However, in other embodiments, the components described in conjunction with FIG. 2 are logic circuits or other specially-designed hardware that are embodied in a field programmable gate array (FPGA).

Herein, the social media gateway 150 can include one or more content filters 202a, 202b, and/or 202c. A content filter 202 can receive all of the messages for the enterprise network 100 from a social media network 108a, 108b, and/or 108c and eliminate or delete those messages that do not require a response. For example, a message on a Facebook page that does not request a response from the user may not need a response. As such, the content filter 202 can filter out or delete that non-suitable message from the messages that are received by social media network application programming interface (API) 1 204a, social media network API 2 204b, and/or social media network API 3 204c. With the content filter 202, the social media network API 204 only needs to translate those messages that should be received by the messaging system 112. Translation typically requires the conversion of the message into a different format.

The content filter 202 is provided with one or more heuristics or filter rules from a filter database (not shown). These filter rules can be created by the user or an administrator of the communication system 101. Thus, the user or administrator of the communication system 101 can customize the filtering of messages from social media networks 108a, 108b, and/or 108c. Further, different rules may be applied to different social media networks, as some social media networks may have different types of messages or postings than other types of social media networks. The filtering may include filters based on the poster of social media content, keywords in the content, or other information.

While the content filter 202 is shown as part of the social media gateway 106, it is to be appreciated that the content filter 202 may be a part of the social media network API 204. The content filter 202 may correspond to the query terms used by the social media network API 204. The content filter 202 or query terms are an argument to the social media network API 204 call. The social media network API 204 can be an application that the social media network 108a, 108b, and/or 108c provides to access the site. Thus, the social media network API 204 is called and connects the social media gateway 150 to the social media network 108a, 108b, and/or 108c. Any suitable filter criteria may be employed. Examples include content of source, address field, destination or recipient address fields, time stamp field, subject matter field, and message body field. For example, searchable content is the name of the person for which an automated response would be sent.

The social media gateway 150 can include one or more social media network API 204. As shown in FIG. 2, the social media gateway 150 may include a social media network API 204 for each social media network 108a, 108b, and/or 108c. As such, the social media gateway 150 can interact with each social media network 108a, 108b, and/or 108c in the particular (often unique) format or protocol used by the social media network 108a, 108b, and/or 108c. Further, when new social media networks are created, the social media gateway 150 can easily be expanded to interact with those social media networks by adding another social media network API 204. Where social media networks 108a are more standardized, or use substantially similar formats or protocols, a single social media network API can be shared by multiple such social media networks 108a-108c.

The social media network API 204 can receive messages from and send messages to the social media network 108a, 108b, and/or 108c. In embodiments, the social media network API 204 may periodically search (e.g., once an hour, day, week, etc.) active social media for messages and automatically receive messages from passive social media. The social media network API 204 can translate a message received from a social media network 108a, 108b, and/or 108c and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the messaging system 112. Further, the social media network API 204 can receive a generally or standard format response message, from the messaging system 112, and translate that response into a particularly or specifically formatted response message that can be posted to the corresponding social media network 108a, 108b, and/or 108c.

Messages to the user are addressed to the user. For example, a person may become a "friend" of the user on a social media network 108b, such as Facebook. The customer may then address a message to the user on Facebook. This non-direct contact is a message that is not sent directly to the user but to the user's Facebook page. In other embodiments, the enterprise network 100 receives messages not addressed to the user. For example, the user can receive tweets from Twitter that are "broadcast" rather than addressed to the user. The enterprise network 100 may also search for messages or content on the social media network 108a, 108b, and/or 108c. Exemplary search criteria include the user's name, user's home address, user's business address, user's employer name, user's educational or professional background, user's hobby, personal or business interests, user's family profile, and the like. Thus, the social media gateway 150 of the enterprise network 100 can query, gather, or connect to a live feed of data from a social media network 108a, 108b, and/or 108c and then apply a filter to the indirect information.

The translated messages from the social media network API 204 can be received by a message filter 206. A message filter 206 can perform some or all of the functions of the content filter 202 and eliminate messages before being sent to the messaging system 112. Thus, the messaging system 112 receives a message where some of the content of the message has been deleted. The message filter 206 can retrieve heuristics or filter rules from a filter database (not shown), similar to the content filter 202. A substantial difference between the content and message filters 202 and 206 is that the content filter 202 is specific to a particular message format associated with a corresponding social media network 108a-108c, while the message filter 206 is applied to a standardized or universal format and is therefore common to multiple social media networks 108a-108c. One skilled in the art will understand the type of rules that may be used to filter information from messages such that only pertinent questions, facts, requests, or information is sent to the messaging system 112.

A message aggregator 208 may also be included with the social media gateway 150. A message aggregator 208 can, in contrast to the message filter 206, combine two or more messages into a packet or grouping that is sent to the messaging system 112. Therefore, the message aggregator 208 can inter-relate or combine messages based on different information within the messages. For example, two messages may be combined based on any of the message fields referenced above, such as the person that posted the message, the subject, the request or question asked, the person the message was sent to, or other information that may be pertinent to the messaging system 112. Thus, the messaging system 112 may be able to respond concurrently to two or more messages based on a grouping provided by the message aggregator 208. If the messages are aggregated or not aggregated, each message can be sent from the social media gateway 150 to the messaging system 112.

The social media gateway 150 can also send responses back to the social media networks 108a, 108b, and/or 108c. A response from the messaging system 112 can be sent to the social media gateway 150. The response may be in a general format and translated. The translated response may then be posted to the appropriate social media network 108a, 108b, and/or 108c by the social media gateway 106. In other embodiments, the messaging system 112 may post the response directly to the social media network 108a, 108b, and/or 108c without sending the response to the social media gateway 150.

It should be noted that the modules, components, and/or systems that are described as executing on the enterprise network 100 may also execute in a user device. Thus, the user's device can manage messaging to social media postings. In other embodiments, the modules, components, and/or systems that are described as executing on the enterprise network 100 may execute on a server for two or more users of an enterprise or in the cloud as a service for two or more users.

Figure 3:
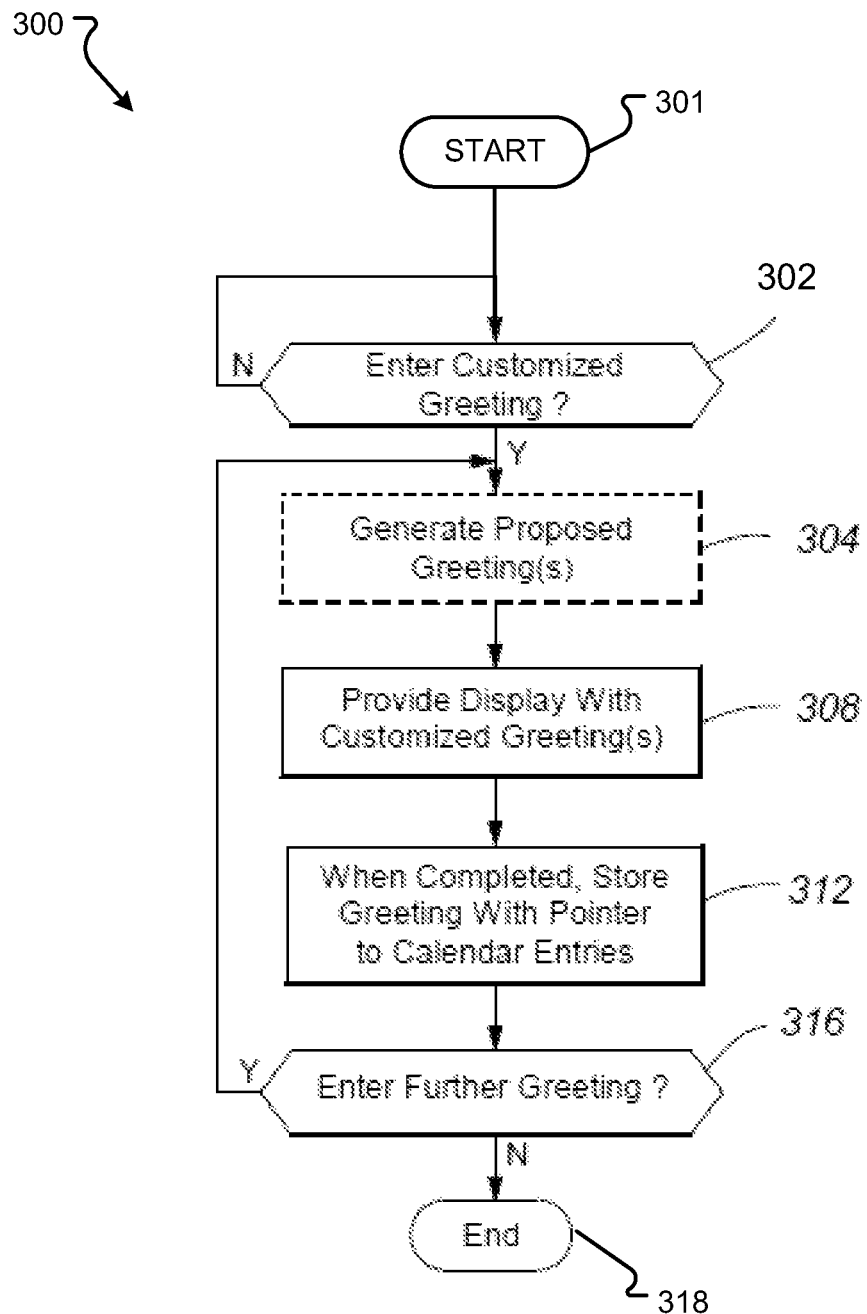
FIG. 3 is a flow diagram of an embodiment of a process for creating a greeting for social media posts.

An embodiment of a process or method 300 shows the operation of the greeting manager 133 in FIG. 3. Generally, the method 300 begins with a start operation 302 and terminates with an end operation 318. While a general order for the steps of the method 300 are shown in FIG. 3, the method 300 can include more or fewer steps or arrange the order of the steps differently than those shown in FIG. 3. The method 300 can be executed as a set of computer-executable instructions executed by a computer system and encoded or stored on a computer readable medium. Hereinafter, the method 300 shall be explained with reference to the systems, components, modules, software, data structures, etc. described in conjunction with FIGS. 1-2 and 5-6.

Figure 5:
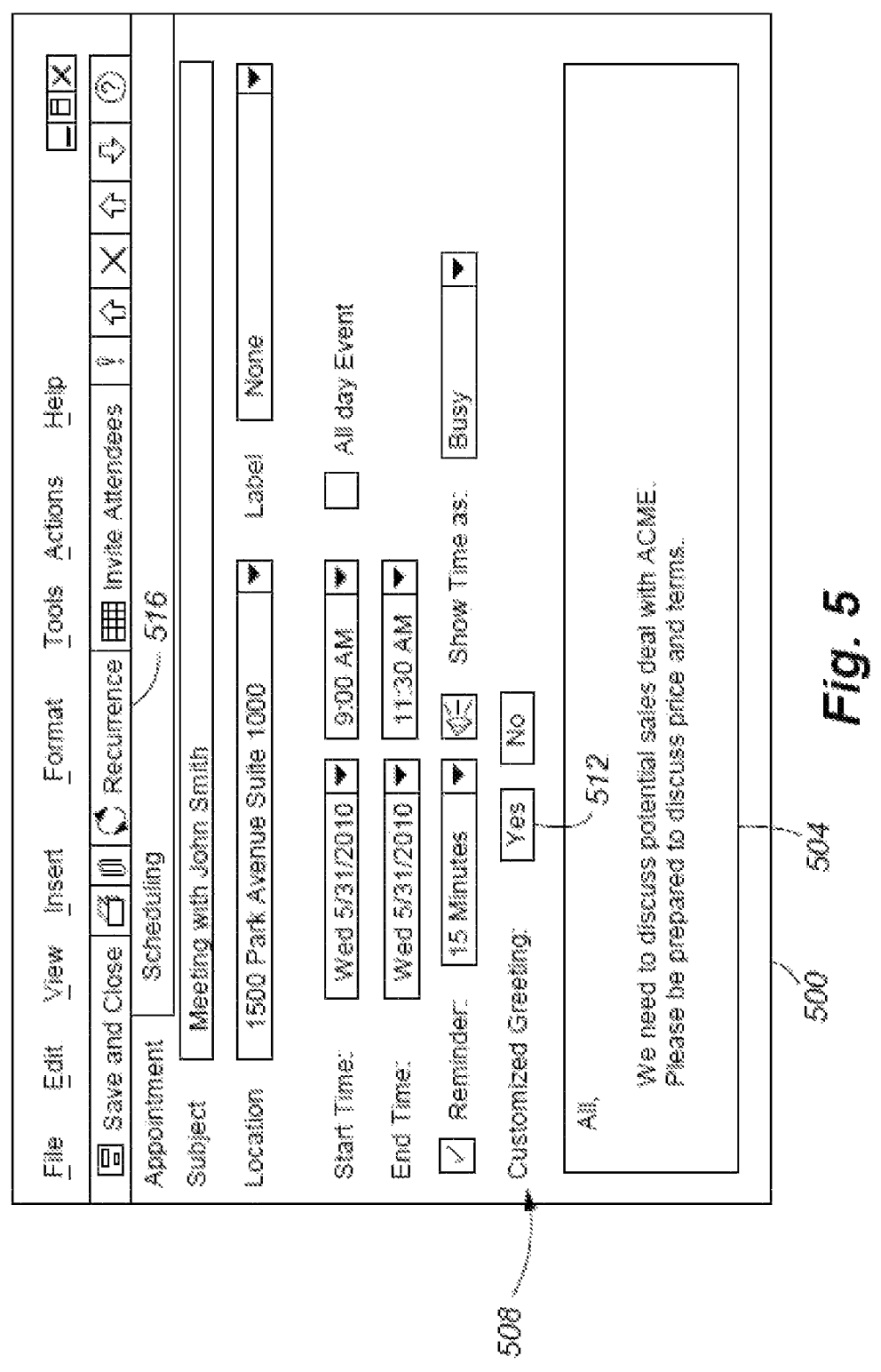

The process 300 starts when a calendar entry is created or edited. Referring to FIG. 5, a screen shot 500 of a calendar module 128 display is depicted. The window is shown as it is displayed for a user creating a new or editing an old calendar entry. The subject of the meeting is "Meeting with John Smith" of Acme Corporation, the location "1500 Park Avenue Suite 1000", the start time "9 AM on Wednesday May 31, 2010", and end time "11:30 AM Wednesday May 31". The description of the meeting is shown in user-entry box 504. A customized greeting option 508 permits the user, by checking the "Yes" icon 512, to enter a customized greeting for contactors during the time scheduled for the meeting (i.e., 9 to 11:30 AM on May 31, 2010).

Referring now to FIG. 3, when a calendar entry is created, the greeting manager 144 determines, in step 302, whether the user desires to enter a customized greeting. Referring to FIG. 5, the greeting manager 144 knows that the user desires to enter a customized greeting when the user clicks on the icon 512. If the user desires to enter a customized greeting, step 302 proceeds YES to step 304. If the user does not desire to enter a customized greeting, step 302 proceeds NO to return to step 302 to await a new greeting.

In response to clicking on the icon 512, the greetings manager 144, in optional step 304, can apply rules or templates to generate a set of proposed greetings for consideration by the user. The rules or templates can themselves be configured by the user. In one configuration, the user can specify, when the entry is created, a type of calendar entry, e.g., an out-of-office meeting entry, an in-the-office meeting entry, a telephone-conference entry, a vacation entry, and an outside-of-business hours entry, that is used for selecting an appropriate set of proposed customized greetings for consideration by the user. When a customized greeting is created by the user, the user can indicate whether or not to have the greeting used as a proposed customized greeting for the type of calendar entry for which the greeting was created. In that event, the user can specify fields in the message to be populated automatically by information in future calendar entries of the same type.

Figure 6:
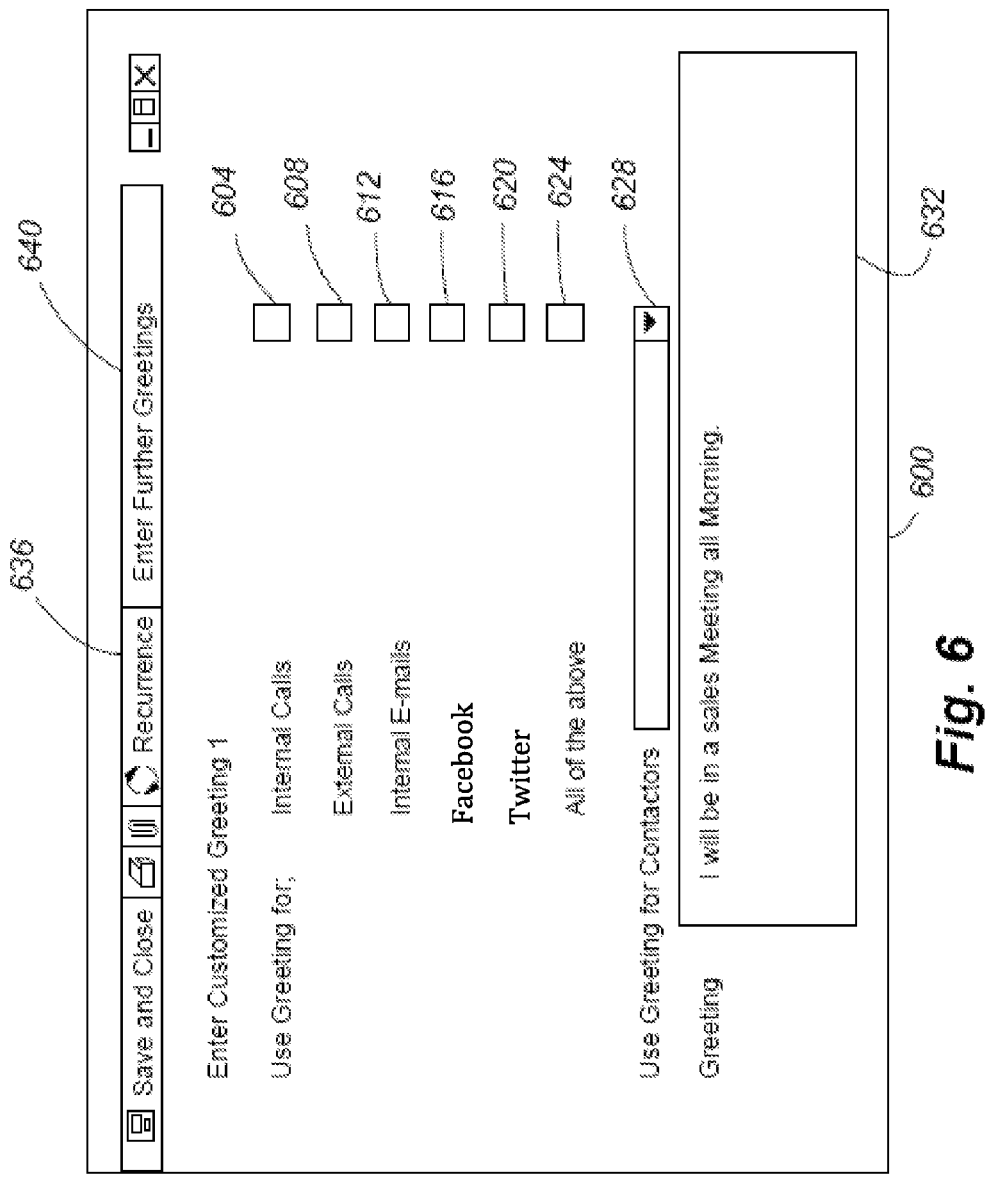
FIG. 6 is an embodiment of a user interface to manage greetings for social media.

The greetings manager 144, in step 308, provides the display of FIG. 6, which may be a child window 600 of the window 500, to the user. The window 600 includes the following fields: use greeting for internal calls 604 (or calls from other users), use greeting for external calls 608 (or calls from non-users), use greeting for internal emails 612 (or emails from other users), use greeting for Facebook messages (or social media content directed to the user on the user's Facebook page), use greeting for Twitter messages (or social media content directed to the user on Twitter), all of the above 624, use greeting for designated users 628, and the box 632 for receiving the customized greeting from the user. Fields 604-624 permit the greeting to be used for specified modalities of communication. The fields for the communication modalities are not limited to those examples shown in FIG. 6. Other modalities can include at least one of, but are not limited to, a MySpace field, a LinkedIn field, a blog field, a micro blog field, a Spoke field, a YouTube field, etc. Thus, the user can tailor greetings for different types of social media.

Field 628 permits the greeting to be used for specified sets of contactors. For example, the user may provide contact information, such as a private cell phone number, for a family member or business acquaintance. Field 628 or another field may also provide selections that relate to responses for social media. For example, selections can be related to one or more of, but are not limited to, the person posting a social media message that requires a response, the degrees of separation of the poster (e.g., degrees of separation is a function in LinkedIn), the content of the posting, the nature of the venue (e.g., private media, public media, semi-private media, etc.), a trust level for the poster, the relationship of the poster with a third party (e.g., an employee of an enterprise, a customer of an enterprise. etc.), etc. As will be appreciated, the box-type fields 604, 608, 612, 616, 620, and 624 could be implemented as a multiple selectable pull-down menu that could list the depicted and additional contact types.

In other embodiments, the user may also be able to select whether a certain type of social media response should be sent by other communication media other than posting on the social media site. For example, a response may not be posted on a public forum. Rather, information about a poster may be found in a database. The information can include an email address or an instant message alias. Thus, the greetings manager 144 can direct the response message to the poster's email or instant messaging alias rather than post the response on the public social media site.

In other alternatives, the greeting may be changed based on the presence of the user. Thus, the messaging system 112 can receive presence information (e.g., physical location information derived from actual determination of the user's location, such as through GPS measurements of the user's phone, or from other information, a logon onto a computer). This presence information can be used to determine whether the user may be available, e.g., the user is in their office. The greeting may change based on the presence of the user. The user may be able to select this option in the user interface 600.

Alternatively or additionally, a field (not shown) could be provided for contactors for whom the greeting is not to be used. The greeting box 632 contains the user selected or entered greeting "I will be in a sales meeting all morning". As can be seen in FIG. 6, the user may select the "recurrence icon" 636, which causes the selected or entered greeting to be used for multiple calendar entries (which are generated by selecting the recurrence icon 516 of FIG. 5). As will be appreciated, a recurring meeting is a meeting that occurs with a selected frequency or periodicity over time.

In step 312, the greetings manager 144, when the save and close command is received, stores the greeting and related information itself or a pointer to the storage location of the greeting and related information in the pertinent calendar entry or entries. In the latter case, a pointer to the relevant calendar entries may be stored at the storage location of the greeting and related information.

In decision diamond 316, the greetings manager 144 determines whether the user has activated the "enter further greetings" icon 640 in FIG. 6. This capability permits a user to enter a number of differing customized greetings for a common calendar entry. This may be desirable, for example, where a user wants to use different greetings for different modalities of communication (e.g., fields 604-620) and/or for different sets of contactors (field 628). Thus, the user can customize greetings for different social media and different parameters associated with the social media postings.

When the user wishes to enter a further greeting, the first greeting shown in FIG. 6 is saved and the window 600 refreshed with a new window having the various fields 604-628 blank. Depending on the configuration, the field 632 may be blank or contain the previously entered greeting in box 632 for editing by the user.

Figure 4:
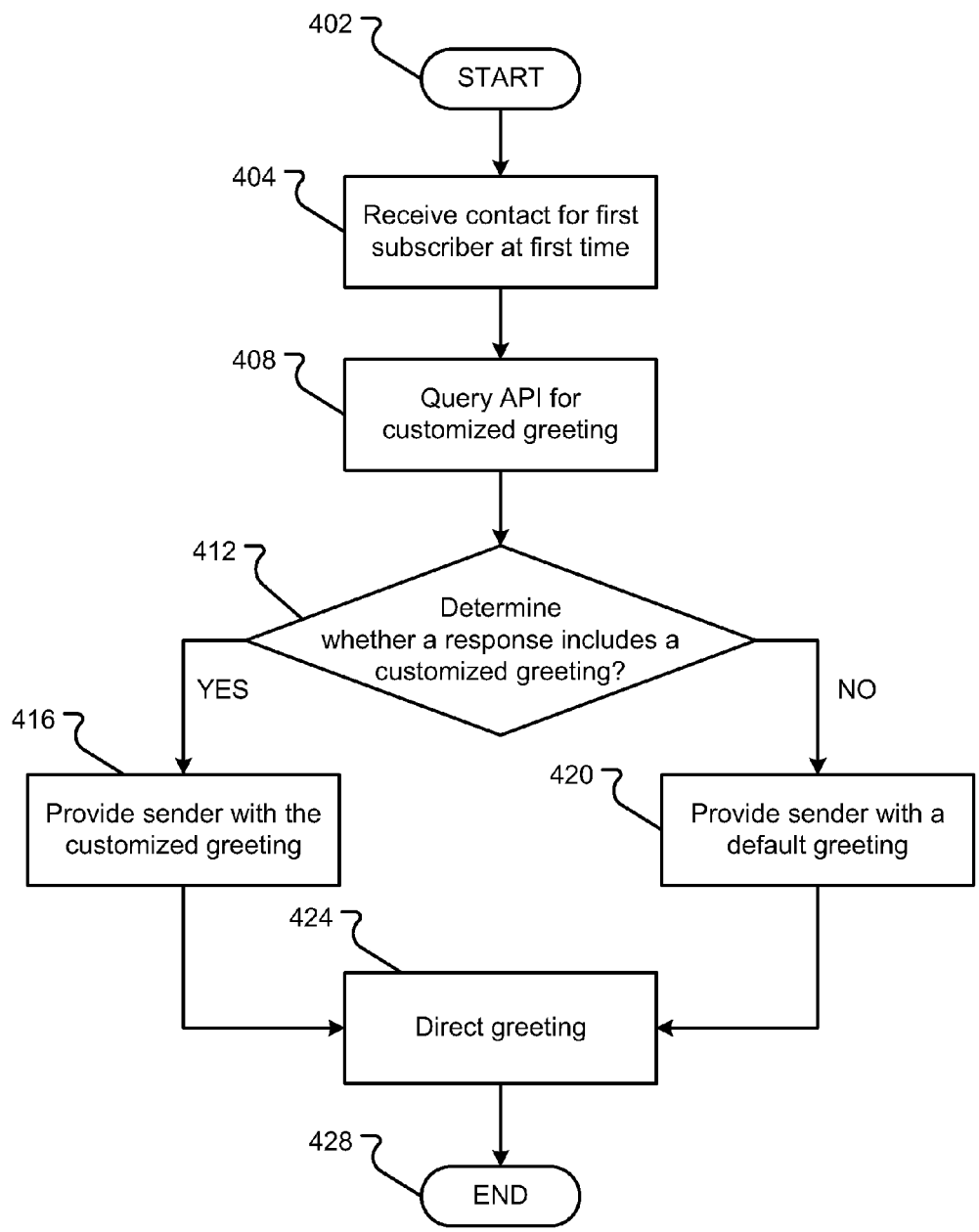
FIG. 4 is a flow diagram of an embodiment of a process for send a greeting to a social media site in response to a message.

An embodiment of a process or method 400 shows the operation of the greeting selection agent 136 in FIG. 4. Generally, the method 400 begins with a start operation 402 and terminates with an end operation 428. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, etc. described in conjunction with FIGS. 1-2 and 5-6.

In step 404, the greeting selection agent 136 is notified when a contact is received for a first or selected user at a first time. The contact may be a posting or content received from passive or active social media. For example, the contact may be a posting to the user's Facebook page. The posting may request a response (e.g., "Bill, would you be up for golf this afternoon?"). In other embodiments, the posting may be from an RSS feed (e.g., "Bill is the best person to talk about this.").

When the incoming contact is a social media posting, the greeting selection agent 136, in step 408, queries the API 140 for customized greeting information, if any. The greeting selection agent 136 may determine if the user responds to the social media content (e.g., a user may be on vacation but may still be able to access their social media and respond). If there is no response after a predetermined amount of time (e.g., a day, an hour, etc.), an out-of-office message may be formulated and sent after a specified amount of time passes without a response by the recipient of the message.

The query to the API 140 includes one or more of the following, but is not limited to, the identity of the first user or messaged user social media network 108, the identity of the sender, the timestamp of the message (e.g., when the message was received), the type of incoming message (e.g., internal email, external email, and instant message), the amount of trust for the sender, the degrees of separation from the sender, the type of venue of the social media, and other parameters of the social media posting. Thus, the API 140 can return any information about the social media, the poster, or the posting that is available. The information returned may be provided by the social media gateway 150 either automatically or returned in response to a request from the API 140. In alternative embodiments, some or all of the information associated with the social media may be stored in the database 120 and not required in the message exchange with the social media gateway 150. For example, the type of venue for the social media (e.g., Facebook is semi-private, a blog is public, etc.) may be stored in the database 120 because this information does not change regardless of the posting.

The API 140 accesses the user database 120 and determines whether the identified user has an active calendar entry covering the period of the timestamp, and, if so, whether the first user has entered a customized greeting. If so, the API 140 accesses the user database 120 to determine whether the customized greeting is to be used for the poster, the venue, the social media type, etc. The API 140 returns a response including an indicator whether a customized greeting is to be used and, if so, a pointer to the storage location of the customized greeting.

In decision diamond 412, the greeting selection agent 136 determines whether the response indicates whether a customized greeting is to be provided. If so, step 412 proceeds YES to step 416 where the greeting selection agent 136 causes the appropriate customized greeting to be provided to the contactor in step 416. If not, step 412 proceeds NO to step 420 where the greeting selection agent 136 causes a default greeting to be provided to the contactor in step 420.

In step 424, the pertinent greeting or message is directed to the contactor. Here, the greeting may be posted to the social media site. For example, a non-specific response used for un-trusted persons or for public forums, such as, "I cannot respond at this time," may be posted to a public forum. In another example, a more tailored message, such as, "Fred, I am in Hawaii right now, I will get back to you when I return on Monday," may be used in private or semi-private forums, e.g., Facebook, with trusted contactors, e.g., friends or family, or people with a low level of separation, e.g., one or two degrees.

In alternative embodiments, the message is directed to the contactor but through different media. A contactor may have a close relationship with the user, e.g., trusted and with a low level of separation. However, the posting may have come from a public social media site. In this situation, information about the contactor may be found in the user's database, such as the contactor's email address for a communication device 110. An email with the greeting may be created and sent to the communication device 110. The greeting can refer to the posting, e.g., "In reference to you blog posting on BizForum, I am in Hawaii right now and will get back to you when I return on Monday."

In still other alternative embodiments, a greeting may require escalation. If the content or the contactor is deemed important, the greeting selection agent 136 may inform the user of the posting. For example, if the content requests and immediate response, or if the person is a family member who needs immediate attention, the greeting selection agent 136 may form an email or create a phone message greeting to send to the user's communication device. Thus, important messages are brought to the user's attention rather than just respond with a greeting.

Another alternative embodiment can prevent duplicate greetings going to multiple social media sites or to the same contactor. The social media gateway 150 may aggregate several messages if the messages are deemed to be the same or similar. For example, a single contactor may post two messages, e.g., one on Facebook and one on MySpace, to the same user for the same reason, e.g., "Hey buddy, want to play golf this weekend?" The message aggregator 208 can deem these messages to be related by the contactor, the content, and the time of posting. Thus, the messages may be grouped and sent to the messaging system 112 together. The greeting selection agent 136 can determine a greeting for the message. Instead of sending the message to both social media sites 108, the greeting selection agent 136 may send one message to one of the social media sites 108 using the social media gateway 150 and reference the other posting. In other embodiments, the content may be similar and several contactors may be involved. The greeting selection agent 136 may still determine that a single response is warranted. Further, a single contactor may post several successive messages over a period of time to the same or multiple social media sites, e.g., "Hey buddy, want to play golf this weekend?," "Dude, what is the best driver on the market?," and "Jill wants me to ask if you and Heather want to go on a picnic on the 15$^{th}$." These repetitive messages may be deemed as related, although the content may be different, and only one response is given to prevent the single contactor from receiving the same greeting multiple times.

A number of other variations and modifications can be used. Further, it would be possible to provide for some features without providing others.

Figure 7:
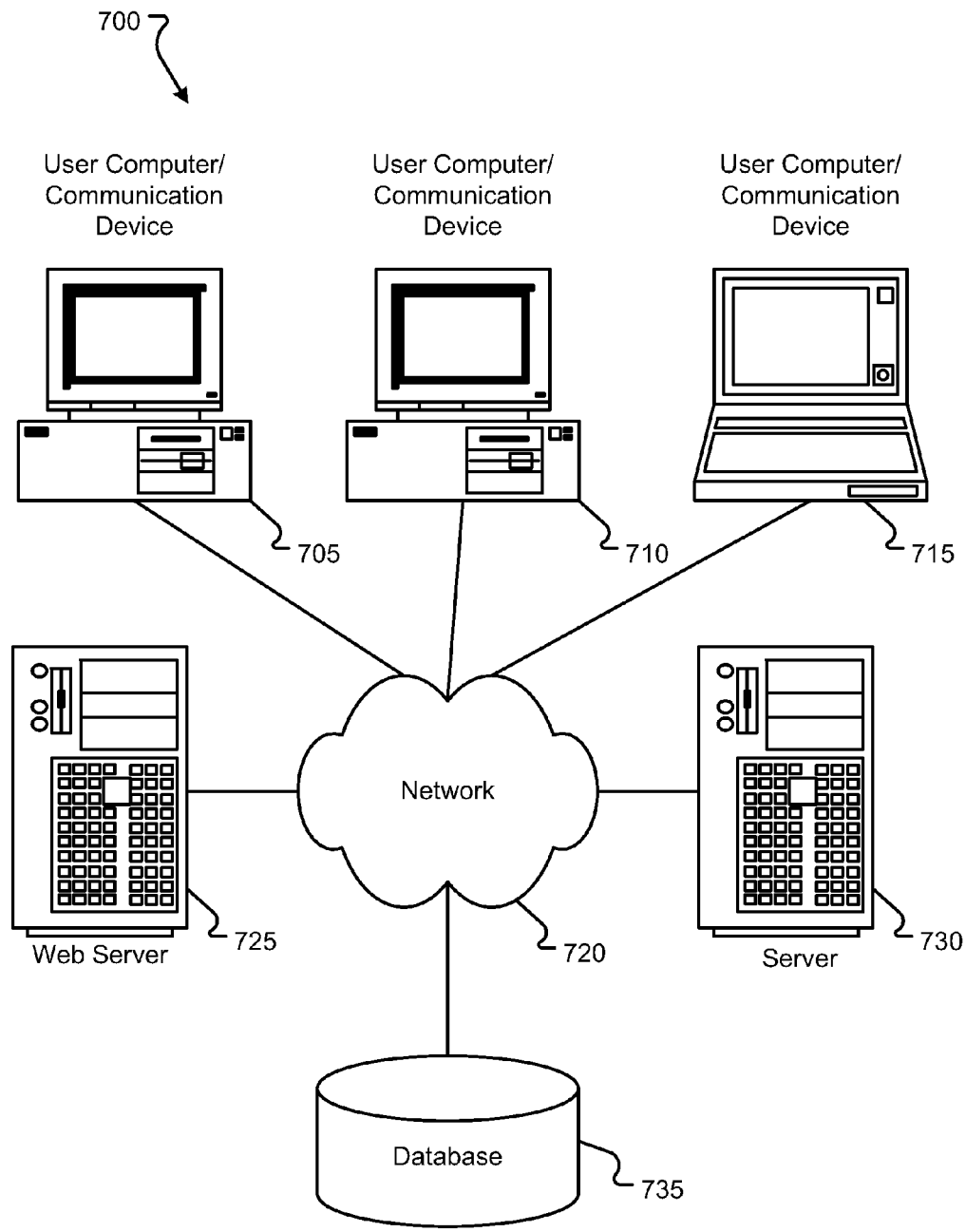
FIG. 7 is a block diagram of an embodiment of a computing environment.

FIG. 7 illustrates a block diagram of a system 700 that may function as servers, computers, or other systems provided herein. The system 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary system 700 is shown with three user computers, any number of user computers may be supported.

System 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth™ protocol known in the art, and/or any other wireless protocol); and/or any combination of these and/or other networks. The network 720 may be the same or similar to network 107.

The system may also include one or more server computers 725, 730. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 805 and can forward the web page requests and/or input data to the web application server 830. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as the system, devices, or components described in FIGS. 1-2.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands.

Figure 8:
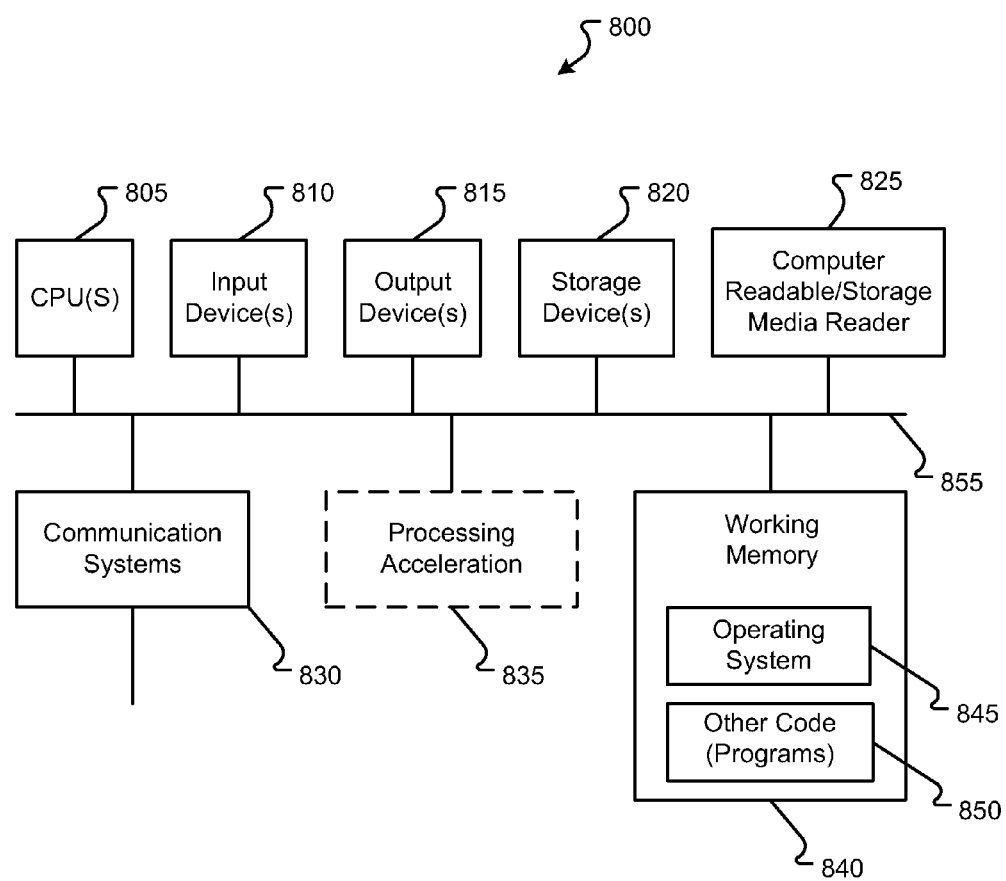
FIG. 8 is a block diagram of an embodiment of a computing system.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the ancillary server 300. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing greetings to social media content, the method comprising:
 a processor scanning a first social media network for first content directed to a user, wherein the first social media network is a passive social media network;
 the processor receiving the first content from the first social media network, wherein the first content includes a first timestamp, a first venue, and a contactor of a first type;
 the processor determining, from an electronic calendar, that the user has a first electronic calendar entry indicating that the user is unavailable at the time of the first timestamp, wherein a first customized greeting, created by the user, is associated with the first electronic calendar entry, wherein the first customized greeting created by the user is specific to the first electronic calendar entry;
 the processor determining the first venue and the first type;
 based on the first venue and the first type, the processor retrieving the first customized greeting created by the user;
 the processor automatically providing the first customized greeting created by the user to the contactor;
 the processor receiving second content from a second social media network directed to the user;
 the processor determining that the first content and the second content are both from the contactor;

the processor determining that the first content and the second content are related; and in response to determining that the first content and the second content are related and both from the contactor, the processor posting the first customized greeting created by the user on the first social media network and in response to determining that the first content and the second content are related and both from the contactor, the processor not posting the first customized greeting created by the user on the second social media network, wherein the posted first customized greeting created by the user on the first social media network also references the second content from the second social media network.

2. The method as defined in claim 1, wherein the first type includes a degree of separation.

3. The method as defined in claim 2, wherein providing the first customized greeting created by the user to the contactor includes one of a group consisting of:

posting the first customized greeting created by the user to the first social media network; and sending a message to a communication device associated with the contactor.

4. The method as defined in claim 3, wherein sending the message to the communication device associated with the contactor includes sending the message through a different media and further comprising one of a group consisting of:

sending a text message to an instant message alias associated with the contactor; and sending an email to the contactor.

5. The method as defined in claim 4, further comprising:

the processor receiving, from the second contactor and at the second social media network, a third content for the user, the third content having a second timestamp and a second venue, wherein the second contactor is of a second type;

the processor determining, from the electronic calendar, that the user has the first electronic calendar entry indicating that the user is unavailable at the time of the second timestamp;

the processor determining the second venue and the second type for the third content;

based on the second venue and the second type of the third content, the processor retrieving a second customized greeting associated with the first electronic calendar entry;

the processor providing the second customized greeting to the second contactor; and wherein the first customized greeting and the second customized greeting are different and wherein the first type and second type are based on information obtained from the first social media network and the second social media network.

6. The method as defined in claim 1, wherein the first customized greeting created by the user that is provided to the contactor is used for multiple calendar entries based on a recurrence selection by the user.

7. The method as defined in claim 1, further comprising the steps of:

receiving third content from the second social media network directed to the user;

determining that the first content and the third content are both from the contactor;

determining that the first social media network is public and the second social media network is private; and in response to determining that the first social media network is public and the second social media network is private, posting the first customized greeting created by the user on the first social media network and posting a different customized greeting on the second social media network.

8. The method of claim 1, wherein the posted first greeting created by the user on the first social media network is directed to a user that posted the first content on the first social media site.

9. A non-transitory computer readable medium having stored thereon instructions that cause a computing system to execute a method for creating customized greetings for social media content, the instructions comprising:

instructions to scan a first social media network for the social media content directed to a user, wherein the first social media network is a passive social media network;

instructions to receive a calendar entry;

instructions to associate a first customized greeting with the calendar entry, wherein the first customized greeting is created by the user specific to the calendar entry;

instructions to receive a first parameter associated with the first customized greeting created by the user, wherein the first parameter identifies the first customized greeting created by the user as a reply to the social media content;

instructions to associate the first parameter with the first customized greeting created by the user; and instructions to store the first customized greeting created by the user;

instructions receive second content from a second social media network directed to the user;

instructions to determine that the first content and the second content are both from the contactor;

instructions to determine that the first content and the second content are related; and in response to determining that the first content and the second content are related and both from the contactor, instructions to post the first customized greeting created by the user on the first social media network and in response to determining that the first content and the second content are related and both from the contactor, the instructions to not post the first customized greeting created by the user on the second social media network, wherein the posted first customized greeting created by the user on the first social media network also references the second content from the second social media network.

10. The computer readable medium as defined in claim 9, wherein the first parameter is a selection of one of a blog, a micro blog, or a video blog as a source of the social media content.

11. The computer readable medium as defined in claim 10, further comprising:

instructions to receive a second parameter associated with the first customized greeting created by the user, wherein the second parameter identifies a type of contactor;

instructions to associate the second parameter with the first customized greeting created by the user.

12. The computer readable medium as defined in claim 11, wherein the type of contactor includes one of a friend, a family, external to an organization, internal to an organization, a degree of separation, a trust level, a customer, or a business associate.

13. The computer readable medium as defined in claim 10, further comprising:

instructions to receive a third parameter associated with the first customized greeting created by the user, wherein the third parameter identifies a venue;

instructions to associate the third parameter with the first customized greeting created by the user.

14. The computer readable medium as defined in claim 11, wherein venue includes one of private, public, or semi-private.

15. A communication system comprising:

a social media gateway including a processor in communication with a first social media network, the social media gateway operable to:

scan the first social media network for first content directed to a user, wherein the first social media network is a passive social media network;

receive the first content from the first social media network, wherein the first content includes a contactor posting a first contact to the first social media network for the user;

post a first greeting created by the user onto the first social media network in reply to the first contact receive second content from a second social media network directed to the user;

determine that the first content and the second content are both from the contactor;

determine that the first content and the second content are related; and in response to determining that the first content and the second content are related and both from the contactor, post the first greeting created by the user on the first social media network and in response to determining that the first content and the second content are related and both from the contactor, not posting the first greeting created by the user on the second social media network, wherein the posted first greeting created by the user on the first social media network also references the second content from the second social media network;

a messaging system in communication with the social media gateway, the messaging system operable to:

access an electronic calendar;

determine, from the electronic calendar, that the user has an electronic calendar entry indicating that the user is unavailable;

determine a greeting associated with the electronic calendar entry, wherein the greeting associated with the electronic calendar entry is specific to the electronic calendar entry;

retrieve the greeting associated with the electronic calendar; and provide the greeting associated with the electronic calendar to the social media gateway.

16. The communication system as defined in claim 15, wherein the social media gateway is further operable to:

filter content received from the social media gateway based on at least one of a keyword or a contactor;

translate the content from the social media gateway; and aggregate one or more contacts from the social media gateway.

17. The communication system as defined in claim 16, wherein the social media gateway is further operable to:

obtain a parameter about the first content from the first social media network;

provide the parameter to the messaging system;

wherein the first greeting is a customized greeting, and the messaging system further operable to determine the customized greeting based on the parameter.

18. The communication system as defined in claim 17, wherein the messaging system further operable to:

determine, from the parameter, that the content requires escalation; and in response to the escalation, directly contacting the user about the content.

* * * * *